(12) United States Patent
Baek et al.

(10) Patent No.: US 11,105,484 B2
(45) Date of Patent: Aug. 31, 2021

(54) LAMP FOR VEHICLE

(71) Applicant: SL Corporation, Daegu (KR)

(72) Inventors: Changwoo Baek, Shelby Township, MI (US); Heeju Ahn, Auburn Hills, MI (US); Jonghun Lee, Auburn Hills, MI (US); ChangSeob Jeong, Rochester Hills, MI (US); Gary Greiner, Auburn Hills, MI (US)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/841,977

(22) Filed: Apr. 7, 2020

(65) Prior Publication Data

US 2021/0140601 A1    May 13, 2021

Related U.S. Application Data

(60) Provisional application No. 62/932,591, filed on Nov. 8, 2019.

(51) Int. Cl.
| | |
|---|---|
| *F21S 41/39* | (2018.01) |
| *F21S 41/657* | (2018.01) |
| *F21S 41/29* | (2018.01) |
| *F21V 29/70* | (2015.01) |
| *F21S 45/48* | (2018.01) |

(52) U.S. Cl.
CPC ........... *F21S 41/657* (2018.01); *F21S 41/295* (2018.01); *F21S 45/48* (2018.01); *F21V 29/70* (2015.01)

(58) Field of Classification Search
None
See application file for complete search history.

(56) References Cited

U.S. PATENT DOCUMENTS

| | | | |
|---|---|---|---|
| 2009/0154190 A1* | 6/2009 | Choi | B60Q 1/0683 |
| | | | 362/549 |
| 2017/0151901 A1* | 6/2017 | Sazuka | F21S 41/151 |
| 2017/0292668 A1* | 10/2017 | Arai | F21S 45/47 |
| 2019/0092219 A1* | 3/2019 | Tajima | B60Q 1/0683 |

* cited by examiner

*Primary Examiner* — Elmito Breval
(74) *Attorney, Agent, or Firm* — Nelson Mullins Riley & Scarborough LLP; Kongsik Kim, Esq.

(57) ABSTRACT

A lamp for a vehicle includes a plurality of optical modules, a first bracket disposed behind the plurality of optical modules to perform aiming in a first direction for the plurality of optical modules, and a second bracket disposed on a rear surface of the first bracket to perform aiming in a second direction for each of the plurality of optical modules. The second bracket is rotatably coupled to the first bracket to allow each of the plurality of optical modules to be aimed in the second direction as the second bracket is rotated.

18 Claims, 11 Drawing Sheets

LAMP FOR VEHICLE

CROSS-REFERENCE TO RELATED APPLICATIONS

The present application claims the benefit of priority to U.S. Provisional Application No. 62/932,591 filed on Nov. 8, 2019, which is incorporated herein by reference in its entirety.

BACKGROUND

1. Technical Field

The present disclosure relates to a lamp for a vehicle including a plurality of optical modules, and more particularly, to a lamp for a vehicle capable of aiming at the same angle for each of the plurality of optical modules.

2. Description of the Related Art

A headlamp of a vehicle secures a driver's view in low light conditions (e.g., at night time) and informs other vehicles or pedestrians of the vehicle's presence. The headlamp includes a high beam and a low beam.

The high beam has a brightness that allows to see objects disposed at longer distances (e.g., about 100 m) and is often used in circumstances requiring a long light throw. However, the high beam may cause glare to a driver of an on-coming vehicle. The low beam is used to identify objects in shorter distances (e.g., about 30 m). Since the use of the high beam and the low beam have different effects, it is necessary to adjust a direction of light irradiation of the high beam and the low beam depending on a vehicle driving environment. Such adjustment of the light irradiation direction of the headlamp is referred to as aiming.

When the headlamp of the vehicle includes a plurality of optical modules, an irradiation direction of light may be adjusted by simultaneously aiming each of the plurality of optical modules. In the case where the plurality of optical modules are linearly arranged, if the aiming is performed on the entire plurality of optical modules, the displacement of the optical modules positioned at both ends may have a large deviation. If the plurality of optical modules are linearly arranged in a lengthwise direction, such a problem occurs especially when performing lengthwise aiming.

SUMMARY

Aspects of the present disclosure provide a lamp for a vehicle capable of improving the accuracy of aiming by individual aiming for each of a plurality of optical modules.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a plurality of optical modules, a first bracket disposed behind the plurality of optical modules to perform aiming in a first direction for the plurality of optical modules, and a second bracket disposed on a rear surface of the first bracket to perform aiming in a second direction for each of the plurality of optical modules. The second bracket may be rotatably coupled to the first bracket to allow each of the plurality of optical modules to be aimed in the second direction as the second bracket is rotated.

In response to pushing or pulling the first bracket at a first position spaced apart by a first predetermined distance in the first direction from a supporting point that rotatably supports the first bracket on a first side of the first bracket, the first bracket may be rotated in the first direction with respect to the supporting point, thereby performing aiming in the first direction for the plurality of optical modules. In response to pushing or pulling the second bracket at a second position spaced apart by a second predetermined distance in the first direction from a coupling point at which the second bracket is rotatably coupled to the first bracket, the second bracket may be rotated in the first direction with respect to the coupling point, thereby performing aiming in the second direction for the plurality of optical modules.

The first bracket may include a plurality of position members that protrude from the first bracket toward the plurality of optical modules. The second bracket may include a plurality of aiming members that protrude from the second bracket toward the plurality of optical modules. Each of the plurality of optical modules may include a first connector coupled to at least one of the plurality of position members and a second connector coupled to at least one of the plurality of aiming members. In particular, in response to pushing the second bracket toward the plurality of optical modules or pulling the second bracket away from the plurality of optical modules, each of the plurality of optical modules may be aimed in the second direction by moving the second connector with respect to the first connector.

Each of the plurality of optical modules may include a pair of first connectors coupled to the first bracket, and a second connector coupled to the second bracket. The pair of first connectors may be spaced apart from each other along the first direction of each of the plurality of optical modules, and the second connector may be spaced apart along the second direction from an imaginary line that connects between the pair of first connectors. The first bracket may include a position member at a position corresponding to each first connector formed in each of the plurality of optical modules, and the position member may be coupled with the each first connector to perform first direction aiming for each of the plurality of optical modules. The second bracket may include an aiming member at a position corresponding to the second connector formed in each of the plurality of optical modules, and the aiming member may push or pull the second connector to perform second direction aiming for each of the plurality of optical modules.

The plurality of optical modules may be disposed in a stepped manner with a step along the second direction, and the aiming member formed on the second bracket may be formed to have a length to allow an end thereof to contact the second connector to push or pull a rear surface of the optical modules. The first bracket may include an opening in a region corresponding to the aiming member formed in the second bracket.

The plurality of optical modules may be linearly arranged, the second bracket may include a pair of pivot bolts, a pivot axis formed by the pair of pivot bolts may be parallel to an arrangement direction of the optical modules, and the second bracket may be rotated about the pivot axis formed by the pair of pivot bolts and may perform second direction aiming.

The lamp for the vehicle may further include an actuator coupled to a portion of the second bracket to push the second bracket forward or pull the second bracket backward, and the actuator may be coupled to the second bracket while being spaced apart from the pivot axis formed by the pair of pivot bolts at a predetermined distance. The actuator may be coupled to the second bracket on an opposite side from an aiming member with respect to the pivot axis formed by the pair of pivot bolts, and the aiming member may be formed to protrude forward from the second bracket and may push or pull the second connector formed on each of the plurality of optical modules. The pivot axis formed by the pair of pivot bolts may intersect a center of gravity of the second bracket or be disposed adjacent to the center of gravity of the second bracket.

The coupling part between the actuator and the second bracket may include a ball joint. The coupling part between the actuator and the second bracket may include a socket on one surface thereof.

Further, each of the plurality of optical modules may include a light source for irradiating light to a front of the optical modules, a lens for diffusing the light irradiated from the light source, and a heat sink for dissipating heat generated from the light source.

The first bracket may include a pair of fixing parts formed on a first side thereof to rotatably support the first bracket and a push part formed on a second side thereof. In response to an external force applied to the push part, the first bracket may be rotated about a rotation axis determined by the pair of fixing parts and performs first direction aiming.

According to exemplary embodiments of the present disclosure, the following effects may be achieved. In a lamp for a vehicle according to the present disclosure, each of a plurality of optical modules may have the same displacement when performing aiming, thereby improving the accuracy of the aiming.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
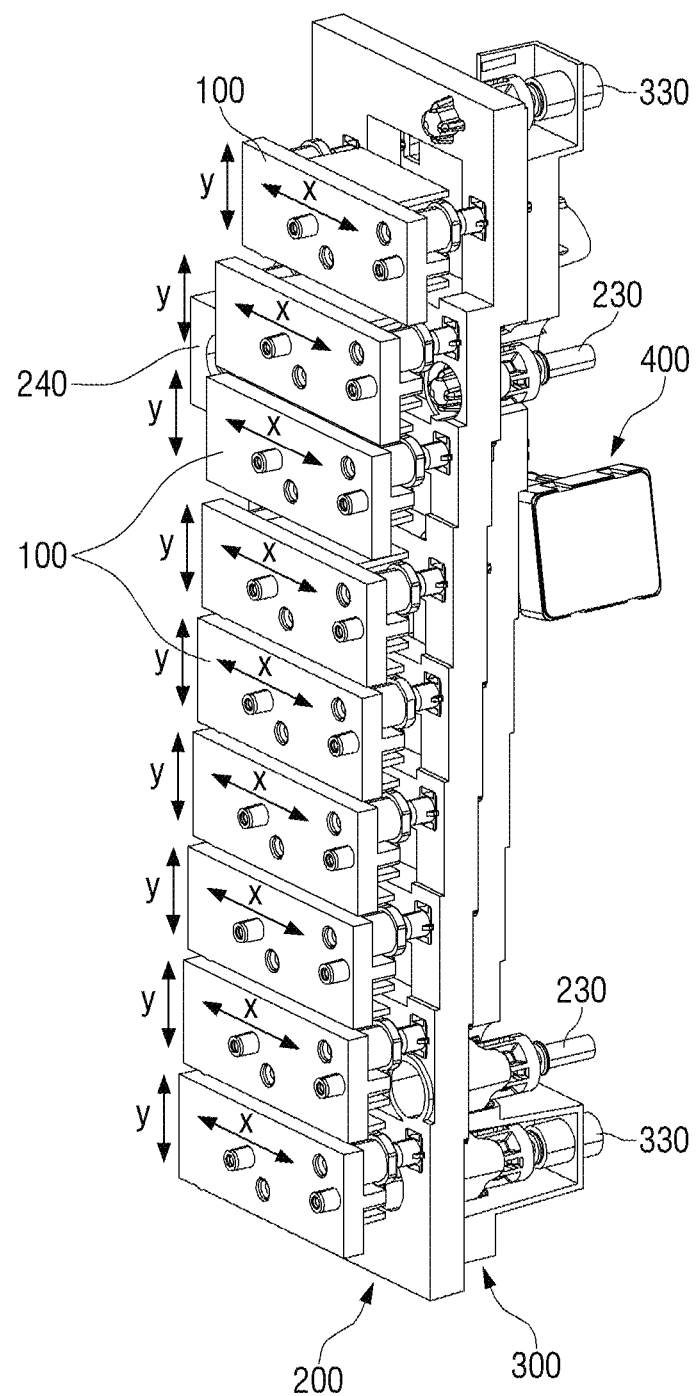
FIG. 1 is a perspective view of a lamp for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present disclosure will be described with reference to the drawings for explaining a lamp for a vehicle according to exemplary embodiments of the present disclosure.

Figure 2:
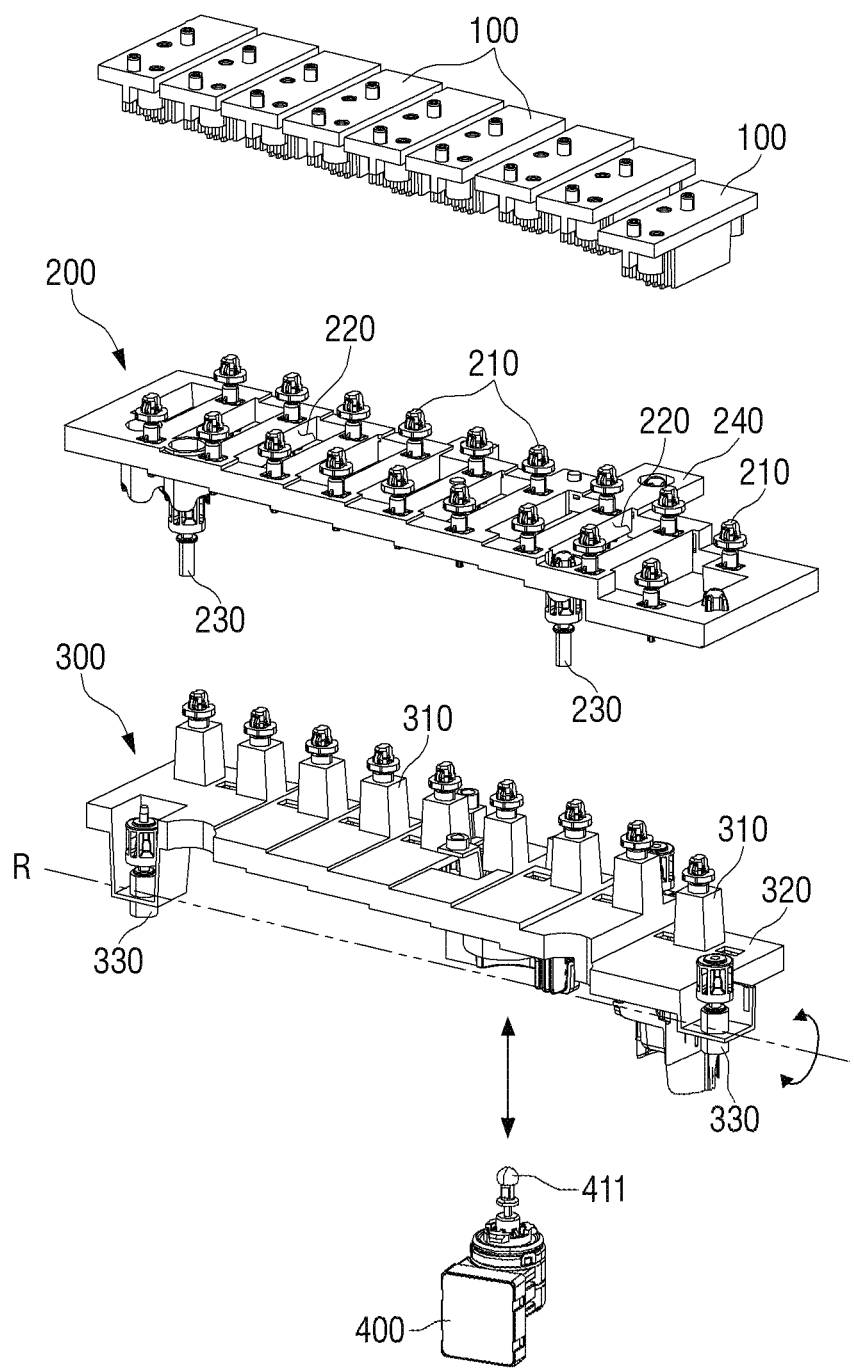
FIG. 2 is an exploded perspective view of a lamp for a vehicle according to the exemplary embodiment of the present disclosure.
Figure 3:
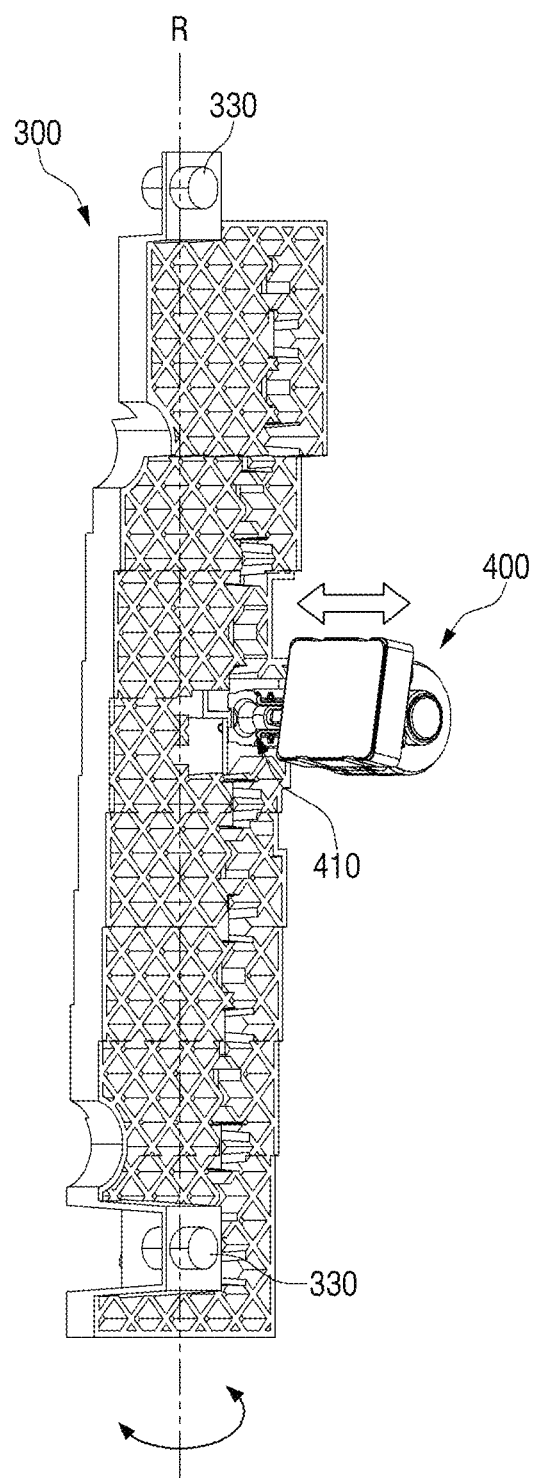
FIG. 3 shows a rear surface of a second bracket of a lamp for a vehicle according to the exemplary embodiment of the present disclosure.

FIG. 1 is a perspective view of a lamp for a vehicle according to an exemplary embodiment of the present disclosure. FIG. 2 is an exploded perspective view of a lamp for a vehicle according to the exemplary embodiment of the present disclosure. FIG. 3 is a view showing a rear surface of a second bracket of a lamp for a vehicle according to the exemplary embodiment of the present disclosure.

Referring to FIGS. 1 to 3, a lamp for a vehicle according to an exemplary embodiment of the present disclosure may include a plurality of optical modules 100 that are linearly arranged, a first bracket 200 disposed on a rear surface of the plurality of optical modules 100 to perform first direction aiming for each of the plurality of optical modules 100, a second bracket 300 disposed on a rear surface of the first bracket 200 to perform second direction aiming for each of the plurality of optical modules 100, and an actuator 400 coupled to a portion of the second bracket 300 to push the second bracket 300 forward or pull it backward.

The optical module 100 may include a light source for irradiating light toward a front of the optical module 100, a lens for diffusing the light irradiated from the light source, and a heat sink for dissipating heat generated from the light source.

According to the exemplary embodiment of the present disclosure, the lamp for the vehicle may include a plurality of optical modules 100, in which the plurality of optical modules 100 may be linearly arranged (e.g., in a straight line). The disposal direction of the plurality of optical modules 100 may be formed in either a horizontal direction or a vertical direction. However, for the convenience of description, the following description will be given with reference to an exemplary embodiment in which the plurality of optical modules 100 are disposed in the vertical direction.

The lamp for the vehicle may adjust an irradiation direction and a light distribution pattern of light by adjusting an orientation angle (e.g., installation angle) of a light source module by aiming. When the plurality of optical modules 100 are rotated about one axis at a time to be aimed at, aiming deviation may become significant depending on a position of the optical module 100. Specifically, in the case where the plurality of optical modules 100 are linearly disposed along the vertical direction, in horizontal direction aiming, the displacement of each optical module 100 with respect to a rotation axis is the same, and thus, the deviation of the aiming may not be a problem. On the other hand, in the vertical direction, the displacement of each optical module 100 with respect to the rotation axis is different, so aiming deviation of the optical module 100 disposed at a first end and the optical module 100 disposed at a second end of an array of lines formed by the plurality of optical modules 100 may occur. The lamp for the vehicle according to the present disclosure can prevent the above-mentioned problem of the aiming deviation by aiming each of the plurality of optical modules 100 around a separate rotation axis.

The first bracket 200 may be disposed on the rear surface of the plurality of optical modules 100 to perform the first direction aiming for each of the optical modules 100. The second bracket 300 may be disposed on the rear surface of the first bracket 200 to perform the second direction aiming for each of the optical modules 100. For convenience of explanation, hereinafter, the first direction is referred to as a horizontal direction (or left and right direction), and the second direction is referred to as a vertical direction (or up and down direction).

Hereinafter, the first direction aiming, i.e., a horizontal aiming, for each of the optical modules 100 will be described.

Each of the plurality of optical modules 100 may include a pair of first connectors that are configured as pivot points coupled to the first bracket. In the horizontal aiming, the orientation angle of the optical module 100 may be adjusted by rotating each of the optical modules 100 about a vertical axis. In order to perform the horizontal aiming, the pair of first connectors may be spaced apart from each other in the horizontal direction. The pair of first connectors may act as an aiming axis P when performing a vertical aiming to be described below.

In addition, each of the plurality of optical modules 100 may include a second connector which is configured as a pivot point that is coupled to the second bracket. The vertical aiming may adjust the orientation angle of the optical module 100 by rotating each of the optical modules 100 about a horizontal axis. In order to perform the vertical aiming, the second connector may be spaced apart in the vertical direction from the pair of first connectors described above.

Each of the first connector and the second connector described above may be formed at a corner region of the optical module 100. Therefore, when each of the pair of first connectors is formed at an upper corner of the optical module 100, the second connector may be formed at a lower corner of the optical module 100. On the other hand, when each of the pair of first connectors is formed at a lower corner of the optical module 100, the second connector may be formed at an upper corner of the optical module 100.

The first bracket 200 may include a pair of fixing parts 230 on a first side thereof and a push part 240 on a second side thereof. A straight line determined by the pair of fixing parts 230 may be configured as a rotation axis of the first bracket 200. Therefore, when an external force is applied to the push part 240, the first bracket 200 may be rotated about the rotation axis. By such rotation, the first bracket 200 may perform horizontal aiming for the plurality of optical modules.

The first bracket 200 may include a position member 210 to more precisely perform the horizontal aiming. The position member 210 included in the first bracket 200 may be formed at a position corresponding to the first connector formed in each of the plurality of optical modules 100. The position member 210 may be coupled with the first connector formed in each of the plurality of optical modules 100 via a screw-coupling. As described above, when the first bracket 200 rotates about the rotation axis determined by the pair of fixing parts 230, the first connector coupled to the position member 210 may also move with the first bracket 200. Therefore, the horizontal aiming may be performed for each of the plurality of optical modules 100 more precisely. In other words, although the horizontal aiming for the plurality of optical modules 100 is performed simultaneously, by providing a separate position member 210 for each optical module 100, displacement for aiming in the horizontal direction may be adjusted independently for each optical module 100.

Hereinafter, the vertical aiming will be described in detail.

Aiming in the vertical direction may be performed by the rotation of the second bracket 300. The second bracket 300 disposed on the rear surface of the first bracket 200 may include an aiming member 310. The aiming member 310 may be formed at a position corresponding to the second connector formed in each of the plurality of optical modules 100.

The aiming member 310 formed on a front surface of the second bracket 300 may have a pillar shape that protrudes from a body 320 of the second bracket 300 toward the front. The aiming member 310 may be formed to have a length such that one end may contact the second connector formed in the optical modules 100 to press a rear surface of each of the optical modules 100. Accordingly, the aiming member 310 may push the second connector of the optical module 100 forward or pull it backward based on the rotation direction of the second bracket 300, thereby performing the vertical aiming for each of the optical modules 100.

Rotation of the second bracket 300 may be performed by the actuator 400 coupled to the rear surface of the second bracket 300. In other words, a first part of the actuator 400 may be fixedly coupled in a housing or the first bracket, and a second part of the actuator 400 may be coupled to the rear surface of the second bracket 300 to rotate the second bracket 300.

When the actuator 400 operates to push the rear surface of the second bracket 300 forward or pull it backward, the second bracket 300 may be rotated about a pivot axis R. If a point at which rotational force is applied to the second bracket 300 corresponds to the pivot axis R, i.e., an actuator coupling part 410 is positioned on the pivot axis R, the second bracket 300 may be unable to rotate. Therefore, the actuator 400 may be spaced apart from the pivot axis R by a predetermined distance and may be coupled to the second bracket 300.

The pivot axis R of the second bracket 300 may be determined by a pair of pivot bolts 330 formed at a portion of the second bracket 300. The pair of pivot bolts 330 may couple the second bracket 300 to the first bracket 200. Specifically, an imaginary line connecting the pair of pivot bolts 330 may form the pivot axis R. The pivot axis R may be disposed on one side of the first bracket 200 and may serve an axis of rotation when the second bracket is rotated. In particular, the pivot axis R of the second bracket 300 may be parallel to a direction in which the plurality of optical modules 100 are arranged. In other words, the pair of pivot bolts 330 may be spaced apart from each other such that the pivot axis R may be formed in the vertical direction.

The aiming member 310 formed on the front surface of the second bracket 300 and the actuator coupling part 410 formed on the rear surface of the second bracket 300 may be disposed on the same side with respect to the pivot axis R. Therefore, when the actuator 400 pushes the second bracket 300 forward, the aiming member 310 may also move forward, and when the actuator 400 pulls the second bracket 300 backward, the aiming member 310 may also move backward. Such driving of the actuator 400 and movement of the aiming member 310 will be described in detail below.

Hereinafter, the coupling relationship between the first bracket 200 and the second bracket 300 and the aiming for each of the plurality of optical modules 100 will be described in more detail.

Figure 4:
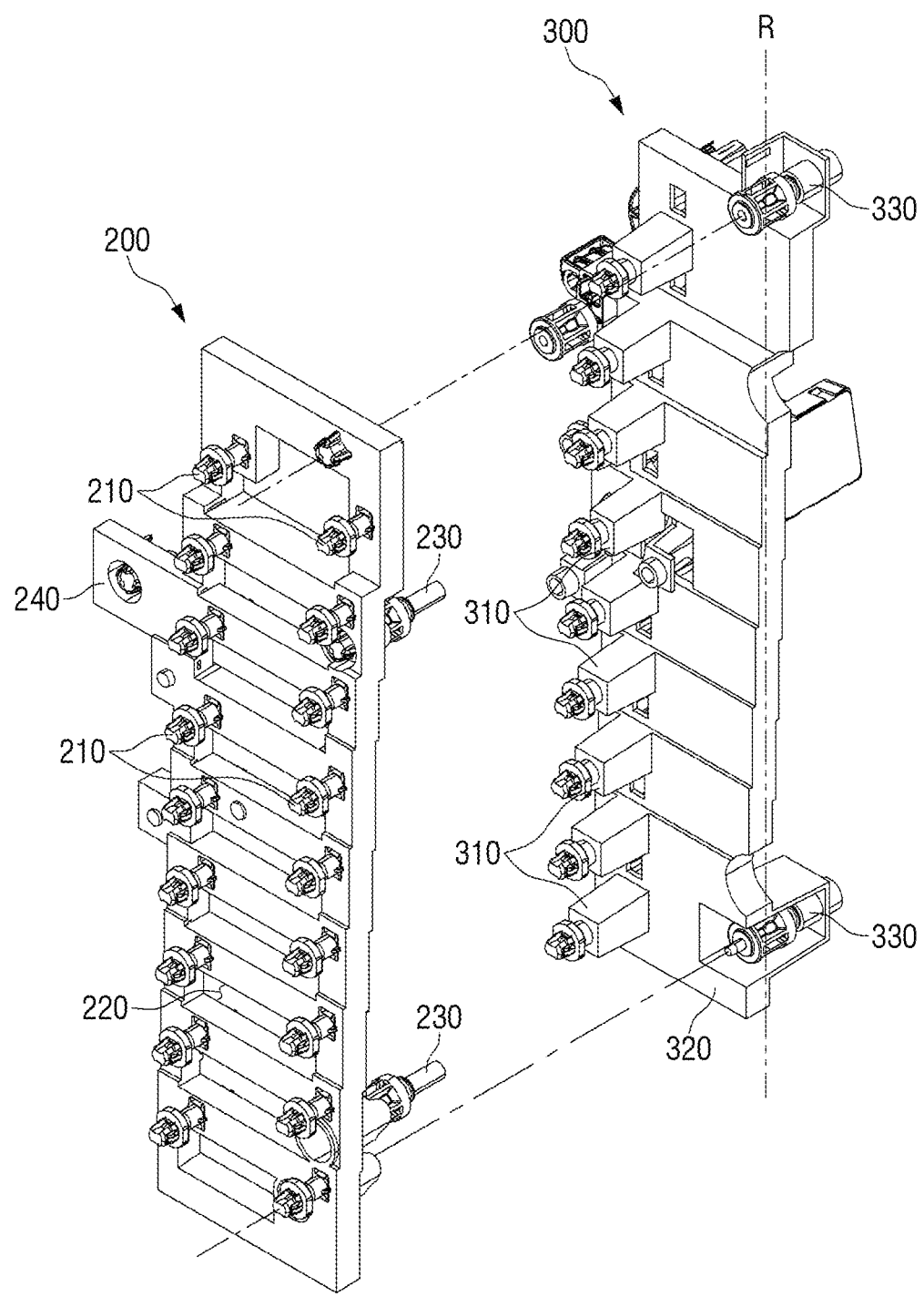
FIGS. 4 and 5 respectively show states before and after coupling of a first bracket and a second bracket of a lamp for a vehicle according to the exemplary embodiment of the present disclosure.
Figure 5:
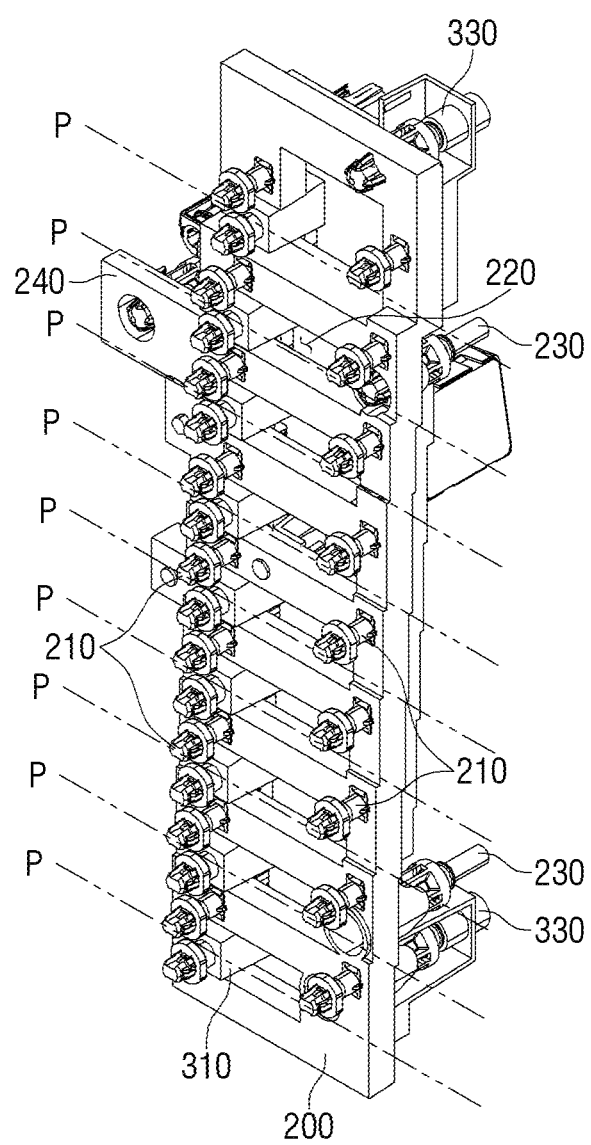
Figure 6:
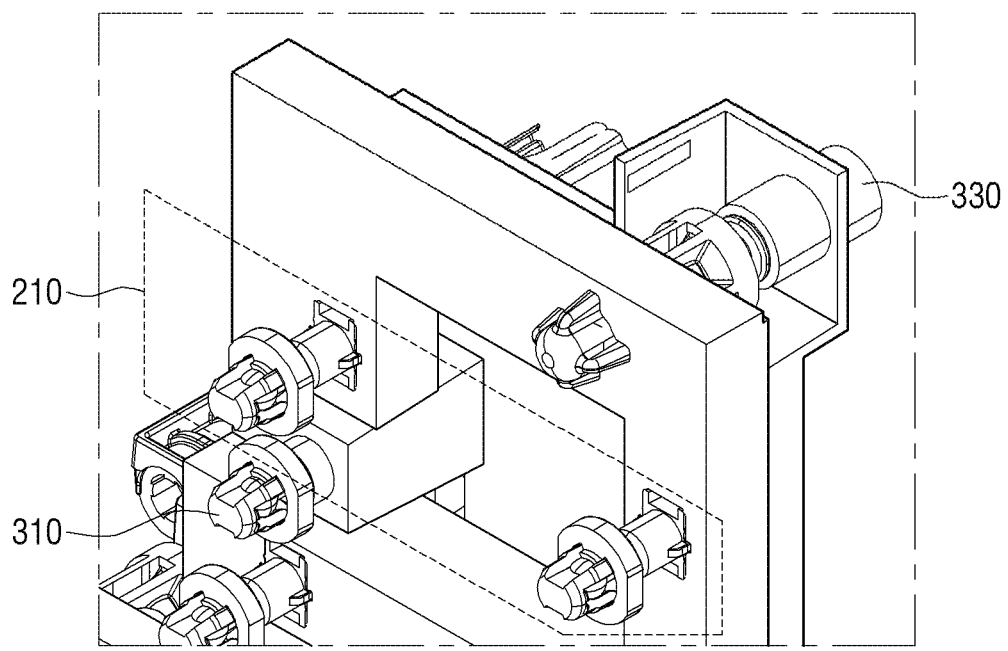
FIG. 6 is an enlarged view showing a first bracket and a second bracket corresponding to a unit optical module of FIG. 5.
Figure 7:
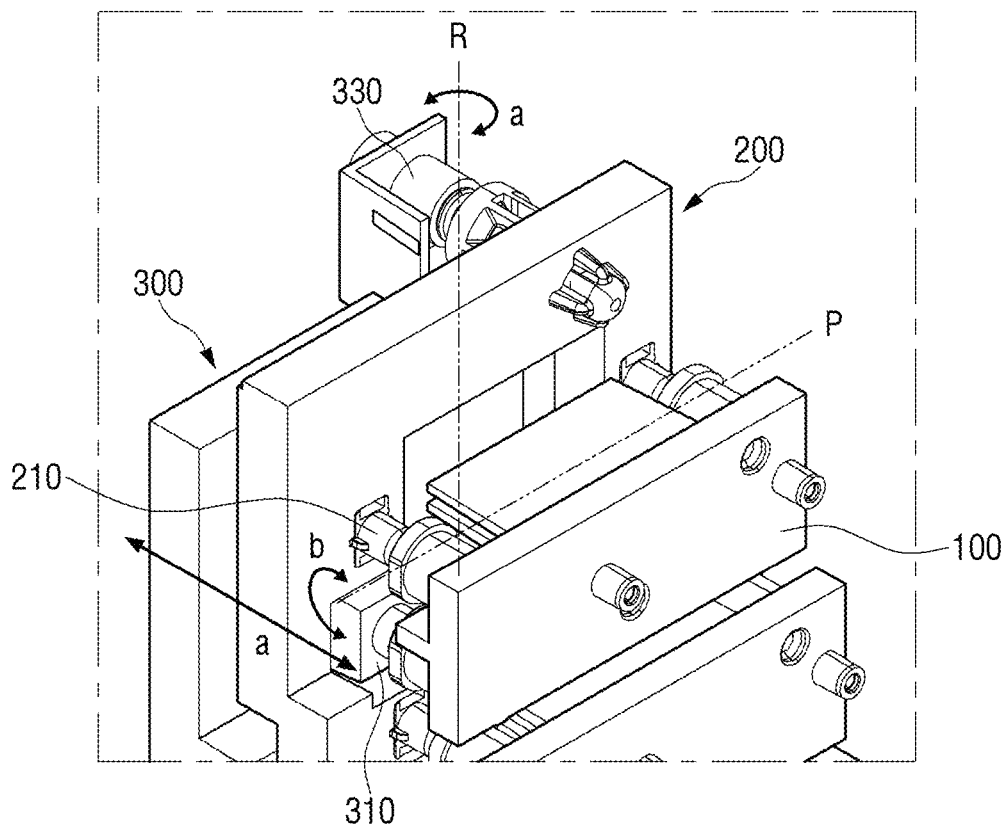
FIGS. 7 and 8 show a state in which an optical module is aimed in a second direction according to the exemplary embodiment of the present disclosure.
Figure 8:
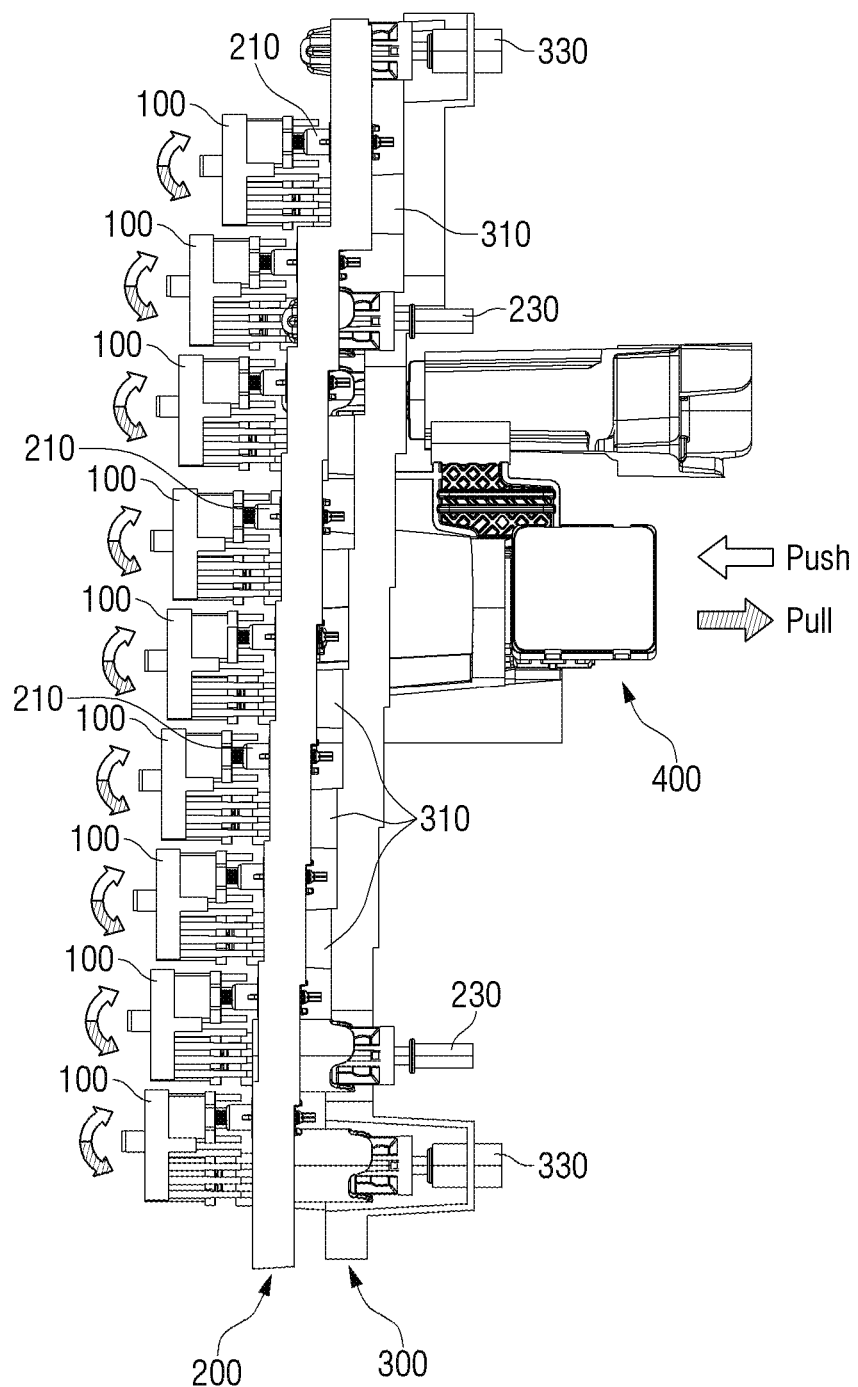

FIGS. 4 and 5 are views showing states before and after coupling of a first bracket 200 and a second bracket 300 according to the exemplary embodiment of the present disclosure. FIG. 6 is an enlarged view showing a first bracket 200 and a second bracket 300 corresponding to a unit optical module 100 of FIG. 5. FIGS. 7 and 8 are views showing a state in which an optical module 100 is aimed in a second direction according to the exemplary embodiment of the present disclosure.

Referring to FIGS. 4 and 5, the first bracket 200 and the second bracket 300 may perform aiming for each of the plurality of optical modules 100 while being coupled to each other. In particular, the aiming member 310 involved in the longitudinal aiming may press the second connector included in each of the optical modules 100 by moving forward through the first bracket 200. Accordingly, the first bracket 200 may include an opening 220 in a region corresponding to the aiming member 310 formed in the second bracket 300, and the aiming member 310 may be displaced forward and backward through the opening 220 provided in the first bracket 200.

A set of the position member 210 and the aiming member 310 corresponding to an optical module 100 is shown in FIG. 6. Referring to FIG. 6, in a region corresponding to an optical module 100, a pair of position members 210 may be disposed linearly at an upper portion, and an aiming member 310 may be disposed an a lower portion. As described above, each of the position member 210 and the aiming member 310 may be formed in a region corresponding to the first connector and the second connector, respectively, formed in the optical module 100. Therefore, the position member 210 and the aiming member 310 may be formed in corner regions of the optical module 100. For example, the position member 210 may be disposed at the lower portion, and the aiming member 310 may be disposed at the upper portion.

The aiming member 310 formed in the second bracket 300 may pass through a through part formed in the first bracket 200 and be coupled to the second connector of the optical module 100. In particular, the optical module 100 may be fixed on the aiming axis P by the coupling between the position member 210 and the first connector. Accordingly, when the aiming member 310 moves in the forward and backward direction, the second connector may move in the forward and backward direction together, and thus the optical module 100 may be rotated about the aiming axis P, thereby performing the vertical aiming.

The coupling between the first connector and the position member 210 and between the second connector and the aiming member 310 described above may be achieved pivotably, for example, using a ball joint.

Hereinafter, referring to FIGS. 7 and 8, the rotation of the second bracket 300 by the operation of the actuator 400 and the aiming in the vertical direction will be described in detail.

The second bracket 300 may be fixed to the first bracket 200 by the pair of pivot bolts 330. As described above, a point of the rear surface of the second bracket 300 may be coupled to the actuator 400. The coupling point of the actuator 400 and the second bracket 300 may be spaced apart from the pivot axis R formed by the pair of pivot bolts 330 at a predetermined distance. Therefore, when the actuator 400 is operated to push the second bracket 300 forward or pull it backward, the second bracket 300 may be rotated about the pivot axis R.

When the second bracket 300 rotates in a direction a as shown in FIG. 7 about the pivot axis R, the aiming member 310 formed on the second bracket 300 may also move in the direction a. Referring to FIG. 7, when the second bracket 300 rotates counterclockwise about the pivot axis R, the aiming member 310 may also rotate counterclockwise to be displaced forward. As described above, the aiming member 310 may move in the direction a to press or decompress the second connector of the optical module 100. When the second connector is pressed or decompressed, the optical module 100 may be rotated about the aiming axis P as shown as direction b in FIG. 7. When the aiming member 310 moves forward as an example described above based on FIG. 7, the optical module 100 may rotate counterclockwise (i.e., tilted upward) about the aiming axis P.

Hereinafter, based on the illustration of FIG. 7, upward or downward aiming of the optical module 100 will be described in more detail.

When the actuator 400 pushes the second bracket 300 forward, the second bracket 300 may rotate counterclockwise about the pivot axis R. When the second bracket 300 rotates counterclockwise about the pivot axis R, the aiming member 310 may move forward and press the second connector. Therefore, the optical module 100 may be rotated in the upward direction because the second connector formed below the first connector moves forward while the aiming axis P formed above the second connector is fixed, thereby performing the upward aiming.

On the other hand, when the actuator 400 pulls the second bracket 300 backwards, the second bracket 300 may rotate clockwise about the pivot axis R. When the second bracket 300 rotates clockwise about the pivot axis R, the aiming member 310 may move backward, and the second connector may be decompressed. Therefore, the optical module 100 may be rotated in the downward direction because the second connector formed below the first connector moves backward while the aiming axis P formed above the second connector is fixed, thereby performing the downward aiming.

As described above, the aiming each of the plurality of optical modules 100 may be simultaneously performed by the rotation of the first bracket 200 and the second bracket 300. However, aiming of a particular optical module 100 may also be performed by manually adjusting the coupling between the first connector and the position member 210 and/or the coupling between the second connector and the aiming member 310.

Figure 9:
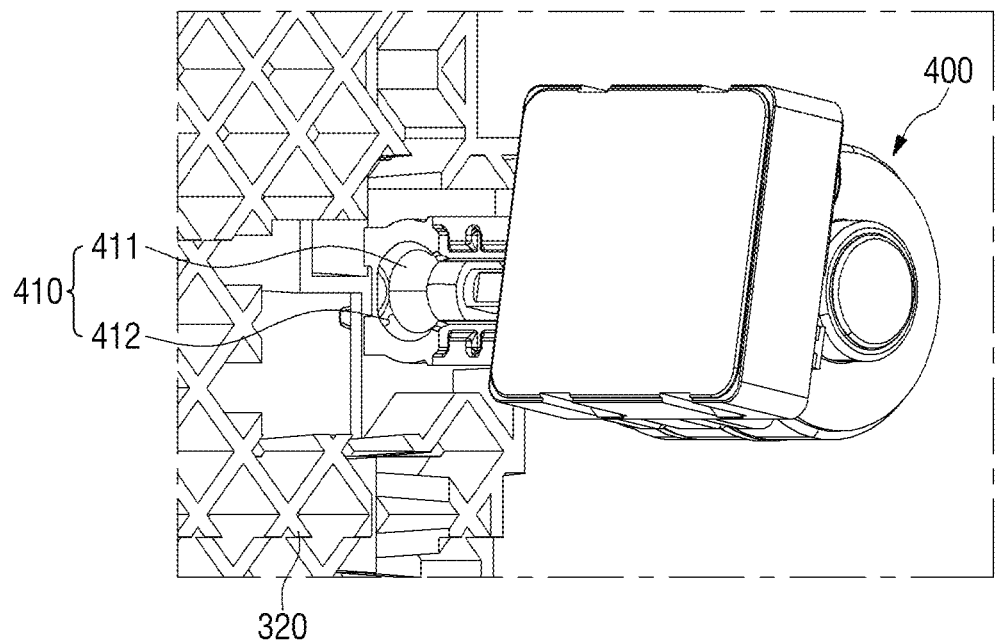
FIG. 9 shows a coupling part of a second bracket and an actuator of a lamp for a vehicle according to the exemplary embodiment of the present disclosure.

FIG. 9 is a view showing a coupling part of a second bracket and an actuator of a lamp for a vehicle according to the exemplary embodiment of the present disclosure.

According the exemplary embodiment of the present disclosure, the actuator 400 may be coupled to the second bracket 300 using a ball joint 411. In addition, the coupling part 410 of the actuator 400 and the second bracket 300 may include a socket 412 (e.g., an open portion or a receiving groove) on one surface. The actuator 400 may push or pull the second bracket 300 in a linear motion in the front and rear direction. On the other hand, the second bracket 300 may be fixed to the first bracket 200 by the pair of pivot bolts 330, and thus, when a force is applied to the second bracket 300 by the linear motion of the actuator 400, the second bracket 300 may rotate about the pivot axis R. Therefore, the coupling part 410 of the actuator 400 and the second bracket 300 may be subjected to a stress while converting the linear motion of the actuator 400 into the rotational motion of the second bracket 300. The socket 412 formed in the coupling part 410 of the actuator 400 and the second bracket 300 may prevent the coupling part 410 from being damaged.

Figure 10:
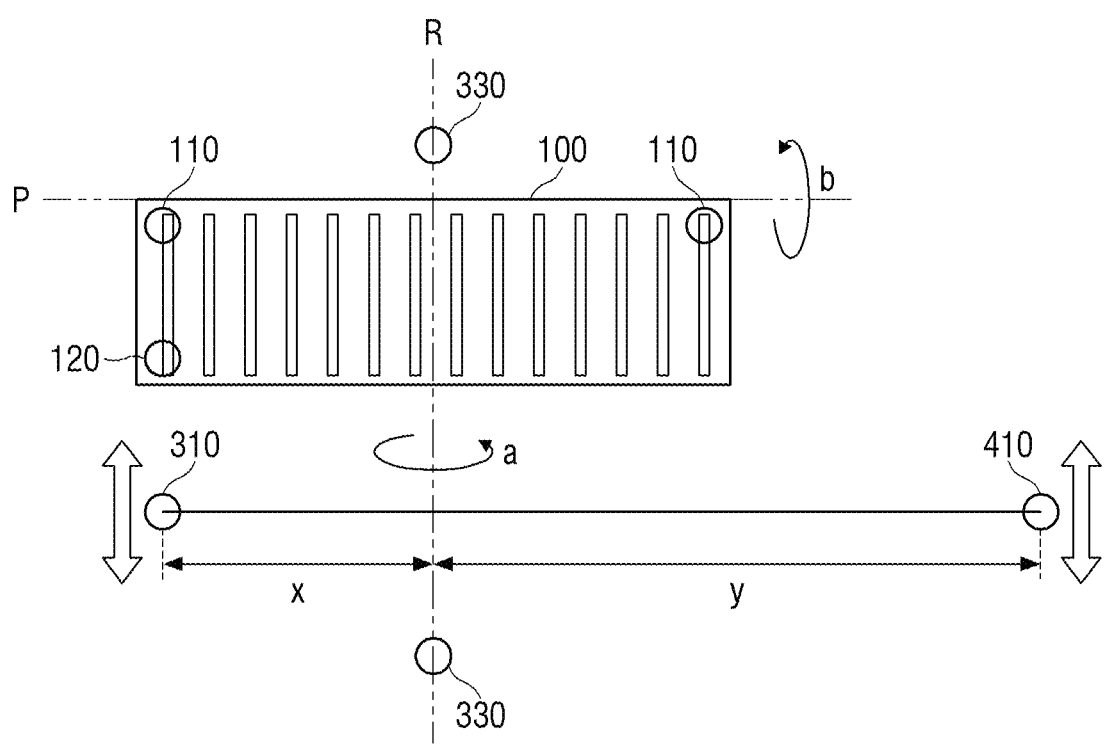
FIG. 10 is a schematic diagram showing a second aiming operation of a lamp for a vehicle according to another exemplary embodiment of the present disclosure.
Figure 11:
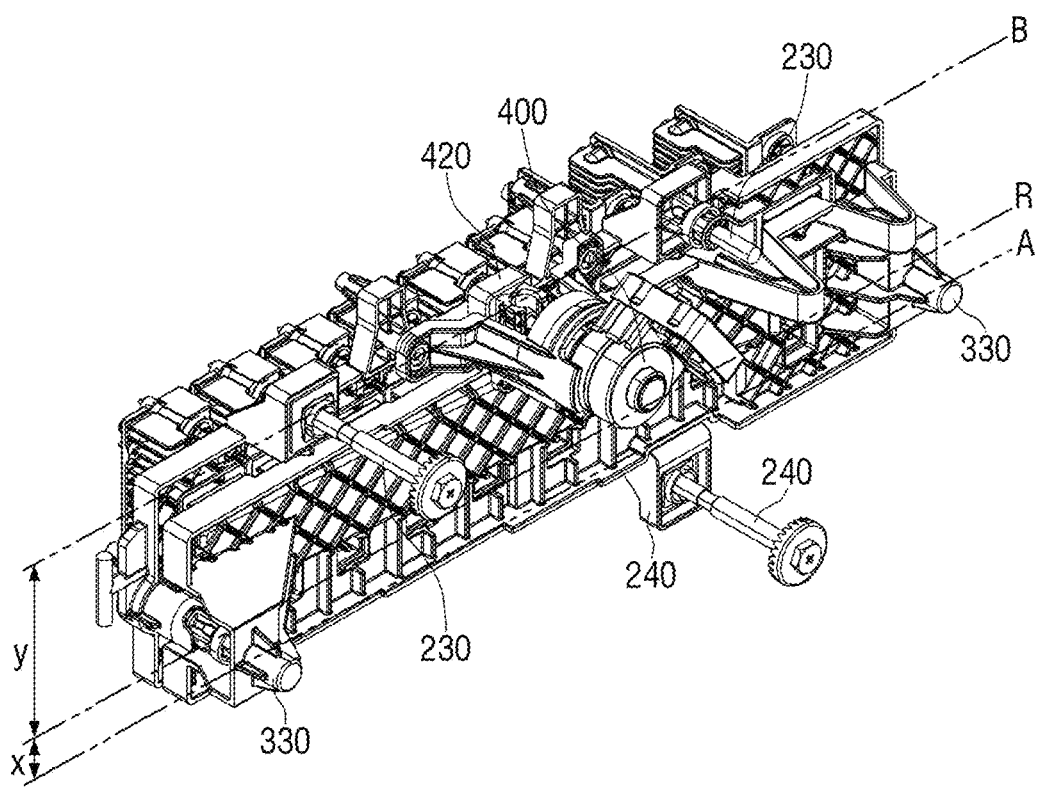
FIG. 11 is a rear perspective view of a lamp for a vehicle according to another exemplary embodiment of the present disclosure.

FIG. 10 is a schematic diagram showing a second aiming operation of a lamp for a vehicle according to another exemplary embodiment of the present disclosure, and FIG. 11 is a rear perspective view of a lamp for a vehicle according to another exemplary embodiment of the present disclosure. In the above description, a process of vertical direction aiming is described based on an exemplary embodiment in which the aiming member 310 formed on the front surface of the second bracket 300 and the actuator coupling part 410 formed on the rear surface of the second bracket 300 may be disposed on the same side with respect to the pivot axis R. However, according to another exemplary embodiment of the present disclosure, the aiming member 310 formed on the front surface of the second bracket 300 and the actuator coupling part 410 formed on the rear surface may be disposed on opposite sides with respect to the pivot axis R.

Specifically, FIG. 10 schematically shows that, for an optical module 100, when the longitudinal aiming occurs as the aiming member 310 pushes a second aiming point 120 forward or pulls it backward, the aiming member 310 and the actuator 400 may be formed on opposite sides with the pivot axis R interposed therebetween.

FIG. 11 is a perspective view of a lamp for a vehicle corresponding to FIG. 10. Here, A denotes a forming position of the aiming member 310, and B denotes a position of the actuator coupling part 410. When the actuator 400 is coupled to the second bracket 300 on the opposite side from the aiming member 310 with respect to the pivot axis R, a driving direction of the actuator 400 and a moving direction of the aiming member 310 may be opposite. In other words, when the actuator 400 pushes the second bracket 300 forward, the aiming member 310 may move backward. On the contrary, when the actuator 400 pulls the second bracket 300 backward, the aiming member 310 may move forward. Therefore, when the first connector is disposed at an upper portion and the second connector is disposed at a lower portion as in the exemplary embodiment described above, the optical module 100 may be aimed downward as the actuator 400 pushes the second bracket 300 forward, and the optical module 100 may be aimed upward as the actuator 400 pulls the second bracket 300 backward.

In addition, by adjusting a distance x between the pivot axis R and the aiming member 310 and a distance y between the pivot axis R and the actuator coupling part 410, the precision of the longitudinal aiming may be adjusted. A distance ratio x/y may be defined as a ratio between the distance x, which is the distance between the pivot axis R and the aiming member 310, and the distance y, which is the distance between the pivot axis R and the actuator coupling part 410. More precise aiming may be performed as the distance ratio x/y is decreased because even if the displacement of the actuator coupling part is greater, the displacement of the aiming member may become smaller. On the other hand, more efficient aiming may be performed as the distance ratio x/y is increased because even if the displacement of the actuator coupling part is formed smaller, the displacement of the aiming member may become greater.

In order to perform precise aiming operation, the distance ratio may be decreased as described above. However, the minimum distance ratio may be restricted due to a spatial limitation of the second bracket. Therefore, the distance y between the pivot axis R and the actuator coupling part 410 may be extended by forming an extension 420 in a partial region of the second bracket 300, and by coupling the actuator 400 to the extension 420.

In concluding the detailed description, those skilled in the art will appreciate that many variations and modifications can be made to the exemplary embodiments without substantially departing from the principles of the present disclosure. Therefore, the disclosed exemplary embodiments of the present disclosure are used in a generic and descriptive sense only and not for purposes of limitation.

What is claimed is:

1. A lamp for a vehicle, comprising:
   a plurality of optical modules;
   a first bracket disposed behind the plurality of optical modules to perform aiming in a first direction for the plurality of optical modules; and
   a second bracket disposed on a rear surface of the first bracket to perform aiming in a second direction for each of the plurality of optical modules,
   wherein the second bracket is rotatably coupled to the first bracket to allow each of the plurality of optical modules to be aimed in the second direction as the second bracket is rotated, and
   wherein the second bracket is connected to the each of the plurality of optical modules via an aiming member that passes through the first bracket such that a movement of the second bracket causes the each of the plurality of optical modules to move individually relative to the first bracket.

2. The lamp for the vehicle of claim 1, wherein in response to pushing or pulling the first bracket at a first position spaced apart by a first predetermined distance in the first direction from a supporting point that rotatably supports the first bracket on a first side of the first bracket, the first bracket is rotated in the first direction with respect to the supporting point, thereby performing aiming in the first direction for the plurality of optical modules, and wherein in response to pushing or pulling the second bracket at a second position spaced apart by a second predetermined distance in the first direction from a coupling point at which the second bracket is rotatably coupled to the first bracket, the second bracket is rotated in the first direction with respect to the coupling point, thereby performing aiming in the second direction for the plurality of optical modules.

3. The lamp for the vehicle of claim 2, wherein the first bracket comprises a plurality of position members that protrude from the first bracket toward the plurality of optical modules, wherein the second bracket comprises a plurality of aiming members that protrude from the second bracket toward the plurality of optical modules, wherein each of the plurality of optical modules comprises a first connector coupled to at least one of the plurality of position members and a second connector coupled to at least one of the plurality of aiming members, and wherein in response to pushing the second bracket toward the plurality of optical modules or pulling the second bracket away from the plurality of optical modules, each of the plurality of optical modules is aimed in the second direction by moving the second connector with respect to the first connector.

4. The lamp for the vehicle of claim 1, wherein each of the plurality of optical modules comprises:

a pair of first connectors coupled to the first bracket; and
a second connector coupled to the second bracket,
wherein the pair of first connectors are spaced apart from each other along the first direction of each of the plurality of optical modules, and
wherein the second connector is spaced apart along the second direction from an imaginary line connecting between the pair of first connectors.

5. The lamp for the vehicle of claim 4, wherein the first bracket comprises a position member at a position corresponding to each first connector formed in each of the plurality of optical modules, and wherein the position member is coupled with the each first connector to perform first direction aiming for each of the plurality of optical modules.

6. The lamp for the vehicle of claim 4, wherein the second bracket comprises an aiming member at a position corresponding to the second connector formed in each of the plurality of optical modules, and wherein the aiming member is configured to push or pull the second connector to perform second direction aiming for each of the plurality of optical modules.

7. The lamp for the vehicle of claim 6, wherein the plurality of optical modules are disposed in a stepped manner with a step along the second direction, and wherein the aiming member formed on the second bracket is formed to have a length to allow an end thereof to contact the second connector to push or pull a rear surface of the optical modules.

8. The lamp for the vehicle of claim 6, wherein the first bracket includes an opening in a region corresponding to the aiming member formed in the second bracket.

9. The lamp for the vehicle of claim 4, wherein the plurality of optical modules are linearly arranged, wherein the second bracket includes a pair of pivot bolts,
wherein a pivot axis formed by the pair of pivot bolts is parallel to an arrangement direction of the optical modules, and
wherein the second bracket is configured to be rotated about the pivot axis formed by the pair of pivot bolts and to perform second direction aiming.

10. The lamp for the vehicle of claim 9, further comprising:

an actuator coupled to a portion of the second bracket to push the second bracket forward or pull the second bracket backward,
wherein the actuator is coupled to the second bracket while being spaced apart from the pivot axis formed by the pair of pivot bolts at a predetermined distance.

11. The lamp for the vehicle of claim 10, wherein the actuator is coupled to the second bracket on an opposite side from an aiming member with respect to the pivot axis formed by the pair of pivot bolts, and wherein the aiming member is formed to protrude forward from the second bracket and configured to push or pull the second connector formed on each of the plurality of optical modules.

12. The lamp for the vehicle of claim 10, wherein the pivot axis formed by the pair of pivot bolts intersects a center of gravity of the second bracket or is disposed adjacent to the center of gravity of the second bracket.

13. The lamp for the vehicle of claim 10, wherein a coupling part between the actuator and the second bracket comprises a ball joint.

14. The lamp for the vehicle of claim 13, wherein the coupling part between the actuator and the second bracket comprises a socket on one surface thereof.

15. The lamp for the vehicle of claim 1, wherein each of the plurality of optical modules comprises:

a light source for irradiating light to a front of the plurality of optical modules;
a lens for diffusing the light irradiated from the light source; and
a heat sink for dissipating heat generated from the light source.

16. The lamp for the vehicle of claim 1, wherein the first bracket comprises:

a pair of fixing parts formed on a first side thereof to rotatably support the first bracket; and
a push part formed on a second side thereof,
wherein in response to an external force applied to the push part, the first bracket is rotated about a rotation axis determined by the pair of fixing parts and performs first direction aiming.

17. A lamp for a vehicle, comprising:

a plurality of optical modules;
a first bracket disposed behind the plurality of optical modules to perform aiming in a first direction for the plurality of optical modules; and
a second bracket disposed on a rear surface of the first bracket to perform aiming in a second direction for each of the plurality of optical modules,
wherein the second bracket is rotatably coupled to the first bracket to allow each of the plurality of optical modules to be aimed in the second direction as the second bracket is rotated,
wherein in response to pushing or pulling the first bracket at a first position spaced apart by a first predetermined distance in the first direction from a supporting point that rotatably supports the first bracket on a first side of the first bracket, the first bracket is rotated in the first direction with respect to the supporting point, thereby performing aiming in the first direction for the plurality of optical modules, and wherein in response to pushing or pulling the second bracket at a second position spaced apart by a second predetermined distance in the first direction from a coupling point at which the second bracket is rotatably coupled to the first bracket, the second bracket is rotated in the first direction with respect to the coupling point, thereby performing aiming in the second direction for the plurality of optical modules.

18. A lamp for a vehicle, comprising:

a plurality of optical modules;

a first bracket disposed behind the plurality of optical modules to perform aiming in a first direction for the plurality of optical modules; and a second bracket disposed on a rear surface of the first bracket to perform aiming in a second direction for each of the plurality of optical modules, wherein the second bracket is rotatably coupled to the first bracket to allow each of the plurality of optical modules to be aimed in the second direction as the second bracket is rotated, wherein each of the plurality of optical modules comprises:

a pair of first connectors coupled to the first bracket; and a second connector coupled to the second bracket, wherein the pair of first connectors are spaced apart from each other along the first direction of each of the plurality of optical modules, and wherein the second connector is spaced apart along the second direction from an imaginary line connecting between the pair of first connectors.

* * * * *